(12) United States Patent
Suzuki et al.

(10) Patent No.: US 6,922,763 B2
(45) Date of Patent: Jul. 26, 2005

(54) METHOD AND APPARATUS FOR STORAGE SYSTEM

(75) Inventors: Susumu Suzuki, Oiso (JP); Haruaki Watanabe, Isehara (JP); Kouji Arai, Odawara (JP)

(73) Assignee: Hitachi, Ltd., Tokyo (JP)

( * ) Notice: Subject to any disclaimer, the term of this patent is extended or adjusted under 35 U.S.C. 154(b) by 377 days.

(21) Appl. No.: 10/327,347

(22) Filed: Dec. 20, 2002

(65) Prior Publication Data

US 2003/0188116 A1 Oct. 2, 2003

(30) Foreign Application Priority Data

Mar. 29, 2002 (JP) .......................................... 2002-094961
Oct. 3, 2002 (JP) .......................................... 2002-290586

(51) Int. Cl.$^7$ .............................................. G06F 12/00
(52) U.S. Cl. ........................ 711/162; 711/161; 711/112; 711/114; 707/204; 714/1; 714/2; 714/3; 714/4; 714/5; 714/6; 714/7
(58) Field of Search ................................ 711/112, 114, 711/161, 162; 707/204; 714/1–7

(56) References Cited

U.S. PATENT DOCUMENTS

2004/0230756 A1 * 11/2004 Achiwa et al. ............. 711/162

2005/0021627 A1 * 1/2005 Achiwa et al. ............. 709/205

FOREIGN PATENT DOCUMENTS

JP          2001-034426          2/2001

* cited by examiner

*Primary Examiner*—Mano Padmanabhan
*Assistant Examiner*—Mehdi Namazi
(74) *Attorney, Agent, or Firm*—Townsend and Townsend and Crew LLP (57) ABSTRACT

The following steps are performed in a storage system: when volumes configuring each volume pair are used by separate applications, storing, for each pair in a memory, an address where updating of data has been made in the volumes as updated-location-managing information; in case a destination-of-restoring copy volume configuring one pair is to be restored to have the contents of a source-for-restoring copy volume belonging to another pair, obtaining, from the memory, pieces of the updated-location-managing information for each of the pairs; generating differential information by merging the pieces of updated-location-managing information obtained, the differential information indicative of a difference in the pieces of updated-location-managing information between the copy volumes; and reproducing the destination-of-restoring copy volume to have the contents of the source-for-restoring copy volume, by copying data designated by the differential information from the source-for-restoring copy volume to the destination-of-restoring copy volume.

13 Claims, 4 Drawing Sheets

FIG. 1

| PAIR NUMBER ,301 | PAIRING STATE ,302 | PRIMARY VOLUME NUMBER ,303 | SECONDARY VOLUME NUMBER ,304 | COPY POINTER ,305 |
|---|---|---|---|---|
| 1 | PAIRED/ COPY UNFINISHED | 12 | 64 | 0 |
| ... | ... | ... | ... | ... |

| LOGICAL VOLUME | PHYSICAL VOLUME |
|---|---|
| A | 103 |
| B | 104 → 105 |
| C | 105 |

FIG. 6

METHOD AND APPARATUS FOR STORAGE SYSTEM

CROSS-REFERENCE TO RELATED APPLICATIONS

The present application claims priority upon Japanese Patent Application No. 2002-94961 filed Mar. 29, 2002, and Japanese Patent Application No. 2002-290586 filed Oct. 3, 2002, which are herein incorporated by reference.

BACKGROUND OF THE INVENTION

1. Field of the Invention

The present invention relates to a feature of sharing copy data created by a storage system among a plurality of storage volumes provided in the storage system.

2. Description of the Related Art

Storage systems comprise features of generating an independently usable copy volume, without involving any host-computer software. A storage control device provided in such a system receives an instruction from external sources; and upon receiving this instruction, the storage control device carries out copying of, for example, a certain logical volume (a primary volume) within the storage control device, generates a copy volume, and forms a pair consisting of the primary volume and the copy volume. Then, by establishing a "split" state in which the synchronism between the primary and copy volumes forming the pair is broken and each of the volumes becomes accessible, for example, the process for resynchronization (a "re-sync" process) between the primary volume and the copy volume is stopped, and, on the other hand, the primary and copy volumes become available for separate uses, respectively. By separately using the respective primary and copy volumes that are in the split state, it becomes possible to conduct concurrent processing, such as carrying out batch operations and/or backup-obtaining operations in view of the copy volume while continuing an online operation with the primary volume. Accordingly, the availability of the storage system will be enhanced.

It is of course possible to use the above-mentioned copy volume as a backup volume for the primary volume. However, another problem arises when generating and operating a plurality of copy volumes that originate from one certain primary volume. That is, in case the primary volume and some of the copy volumes originating from that primary volume are used by different applications, there arises a need to further make a backup copy for each of the copy volumes, and it becomes inevitable to use "copies of the copy volumes" according to the number of copy volumes. Japanese Patent Application Laid-open Publication No. 2001-34426 discloses a system configured to comprise a plurality of copies of logical volumes.

In addition, unless the difference in data between the primary and copy volumes is managed for each pair upon updating the above-mentioned primary volume or each of the copy volumes, it will become necessary to copy the whole data in the volume, which is used as the source for backup, to the volume to where the data is to be restored. If it were to carry out such a restoring process for a plurality of copy volumes, an enormous amount of data will have to be handled during copying and other accompanying processes. Accordingly, there arises a possibility that the processing time will be extended, process efficiency will deteriorate, and the system load will increase. Anyhow, such a restoring process tends to lead to system complication and/or increase in operational loads.

SUMMARY OF THE INVENTION

The present invention has been contrived in view of the above and other problems, and an object thereof is to provide an efficient and highly operable method of managing backup and restoring among copy volumes.

In order to achieve the above and other objects, one aspect of the present invention is a method of managing backup and restoring of data between a plurality of copy volumes in a storage system. Each of the copy volumes originates from a single volume and configures a pair with the single volume. Each of the copy volumes is capable of being independently used. The managing method comprises: when the volumes configuring each pair are used by separate applications, storing, for each pair in a memory, an address at which updating of data has been made in the volumes as updated-location-managing information; in case a copy volume configuring a first pair is to be restored to have the contents of a copy volume belonging to a second pair, obtaining, from the memory, pieces of the updated-location-managing information for each of the first and second pairs; generating differential information by merging the pieces of updated-location-managing information obtained, the differential information indicative of a difference in the pieces of updated-location-managing information between the copy volumes; and reproducing the copy volume which is to be restored to have the contents of the copy volume to be the source of restoring, by copying data designated by the differential information from the copy volume to be the source of restoring to the copy volume which is to be restored.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein.

DETAILED DESCRIPTION OF THE INVENTION

At least the following matters will be made clear by the explanation in the present specification and the description of the accompanying drawings.

Figure 1:
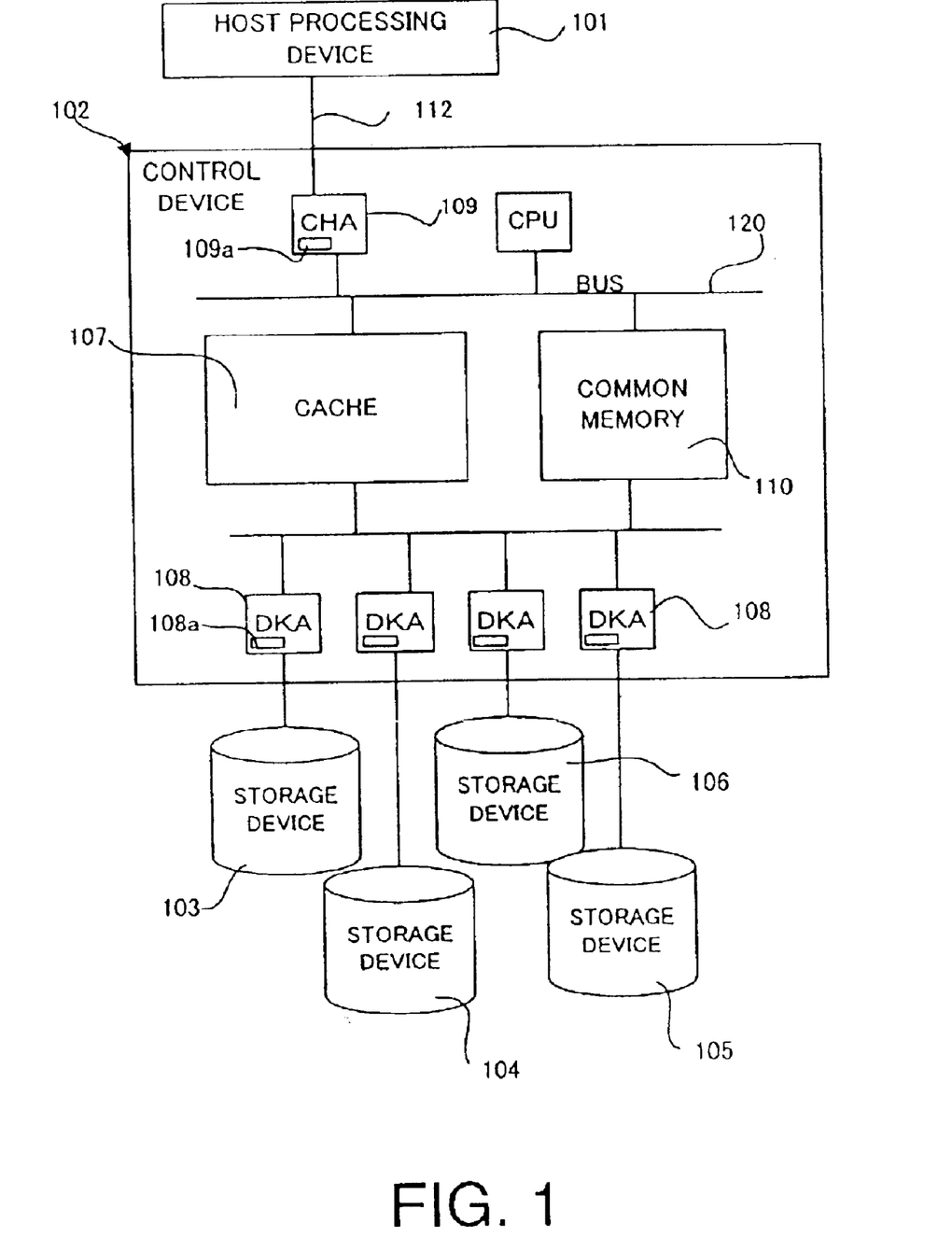
FIG. 1 shows a diagram showing a schematic system configuration for explaining the method of managing backup and restoring of the present embodiment.

FIG. 1 shows a diagram showing a schematic system configuration for explaining a method of managing backup and restoring according to the present embodiment. The system comprises, for example: a processing device 101; a storage control device 102; and storage devices 103, 104, 105, 106. The processing device 101 is constructed of, for example, a mainframe computer or a personal computer. To the processing device 101, there is connected the storage control device 102 through an interface 112 (which may function as "communication means") such as SCSI, Fibre Channel, and the like.

The storage control device 102 comprises, as a matter of course, a CPU (which may function as "means for executing the steps" for the procedure explained below) and an input/output interface (not shown) located between the processing device 101. The storage control device 102 further comprises, for example: a cache memory 107 (which may function as a "computer readable medium"); a common memory 110 (which may also function as a "computer readable medium"); a channel adapter (described as CHA) 109 for carrying out cache control, data-transfer control, and the like; and disk adapters (described as DKA; these may function as "means for reading/writing") 108 for carrying out input/output control to the storage devices. Upon request from the processing device 101, the storage control device 102 transmits various kinds of control information stored in the common memory 110 etc. to the respective disk adapters 108 of each of the storage devices 103, 104, 105, 106 through a bus connecting each of the devices etc., and controls each of the storage devices. Note that the above-mentioned control information is actually used by the respective processors 108a, 109a of the channel adapter 109 and/or the disk adapters 108. It is also to be noted that the above-mentioned "common memory" may also be called a "shared memory", because several processors share its resources.

The storage device is a disk-array apparatus functioning as a storing device. FIG. 1 shows a plurality of storage devices 103–106. These storage devices 103, 104, 105, 106 are connected to the disk adapters 108 of the storage control device 102 through an interface such as SCSI. The storage control device 102 manages logical units formed by using physical storage areas of the storage devices 103, 104, 105, 106, and also manages logical storage areas provided by the storage devices using data blocks partitioned within the above-mentioned logical units. The logical units are identified by LUNs (Logical Unit Numbers), and the data blocks are designated by block addresses.

Figure 2:
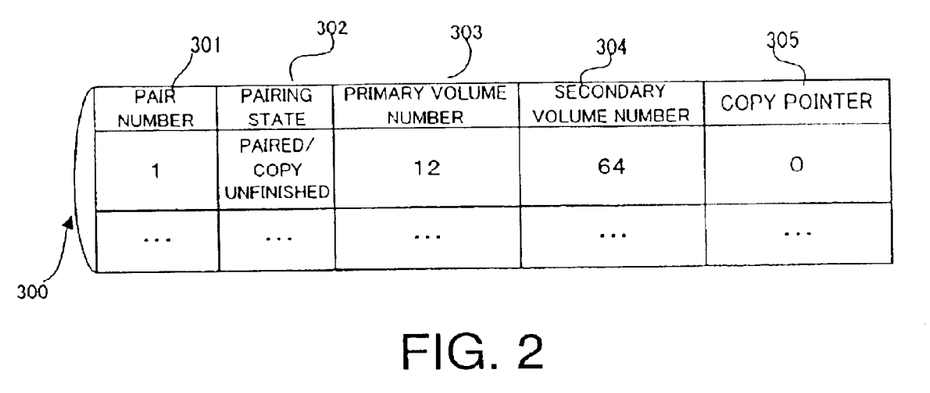
FIG. 2 shows a diagram for explaining an example of a pair-information table according to the present embodiment.

FIG. 2 shows a diagram for explaining an example of a pair-information table according to the present embodiment. In a case where the storage control device 102 creates a mirror volume (or a copy volume) of a primary volume in which the mirror volume is independently usable without intervention of the processing device 101, it will be necessary to manage information (i.e., pair information 300) regarding the pair consisting of the primary and copy volumes. In order to do so, (1) a pair number 301 is set for each pair, (2) a pairing state 302 for the corresponding pair number 301, a primary-volume number 303, and a secondary-volume number 304 are correlated with each other, and (3) the pair is updated and managed under the above correlation. Note that the "secondary volume" in the pair information 300 signifies a volume where a copy of the primary volume is to be formed, regardless of whether the copying has finished or not.

Further, when a plurality of copy volumes are created for one primary volume, a plurality of pairs having the same primary volume will be established for each of the copy volumes. The pair information 300 is stored in the common memory 110 as information for control.

For example, the following states can be set as the "pairing state" for each pair: a "pending state" in which copying (initial copying) is being carried out between the primary volume and the copy volume; a "duplex state" which is a state where the above-mentioned initial copying has finished; and a "split state" in which the duplex state between the primary and copy volumes has been cancelled and each of the copy volumes can independently be used. According to the above, for example, the pair having pair number 1 in FIG. 2 would be in a "pending state" in which a primary volume having volume number 12 and a copy volume having volume number 64 are established as a pair, but the initial copying still has not been completed. Accordingly, the copy pointer 305 will be set to "0"; in other words, a flag indicating that copying has not been complete will be turned ON.

Figure 3:
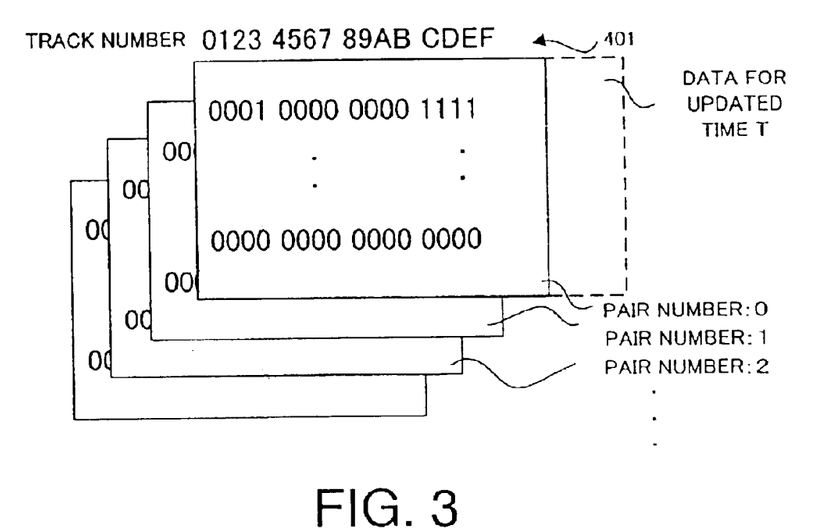
FIG. 3 shows a diagram for explaining an example of a data configuration of updated-location-managing information according to the present embodiment.

FIG. 3 shows a diagram for explaining an example of a data configuration of "updated-location-managing information" (which is information for managing updated locations) according to the present embodiment. If a primary volume and/or its copy volume has been used by different applications and their contents have been updated, there will be a need to manage, for each pair, the differences in data between the primary and copy volumes occurring along with this updating process. The updated-location-managing information 401 is arranged taking the pair number 301 as a key, and is formed of, for example, a differential location bitmap. The "differential location bitmap" is a table for managing whether or not an updating process has been carried out in view of a data block by turning a corresponding bit ON/OFF based on, for example, a track-number array. This information is stored in the common memory 110 as information for control.

Figure 4:
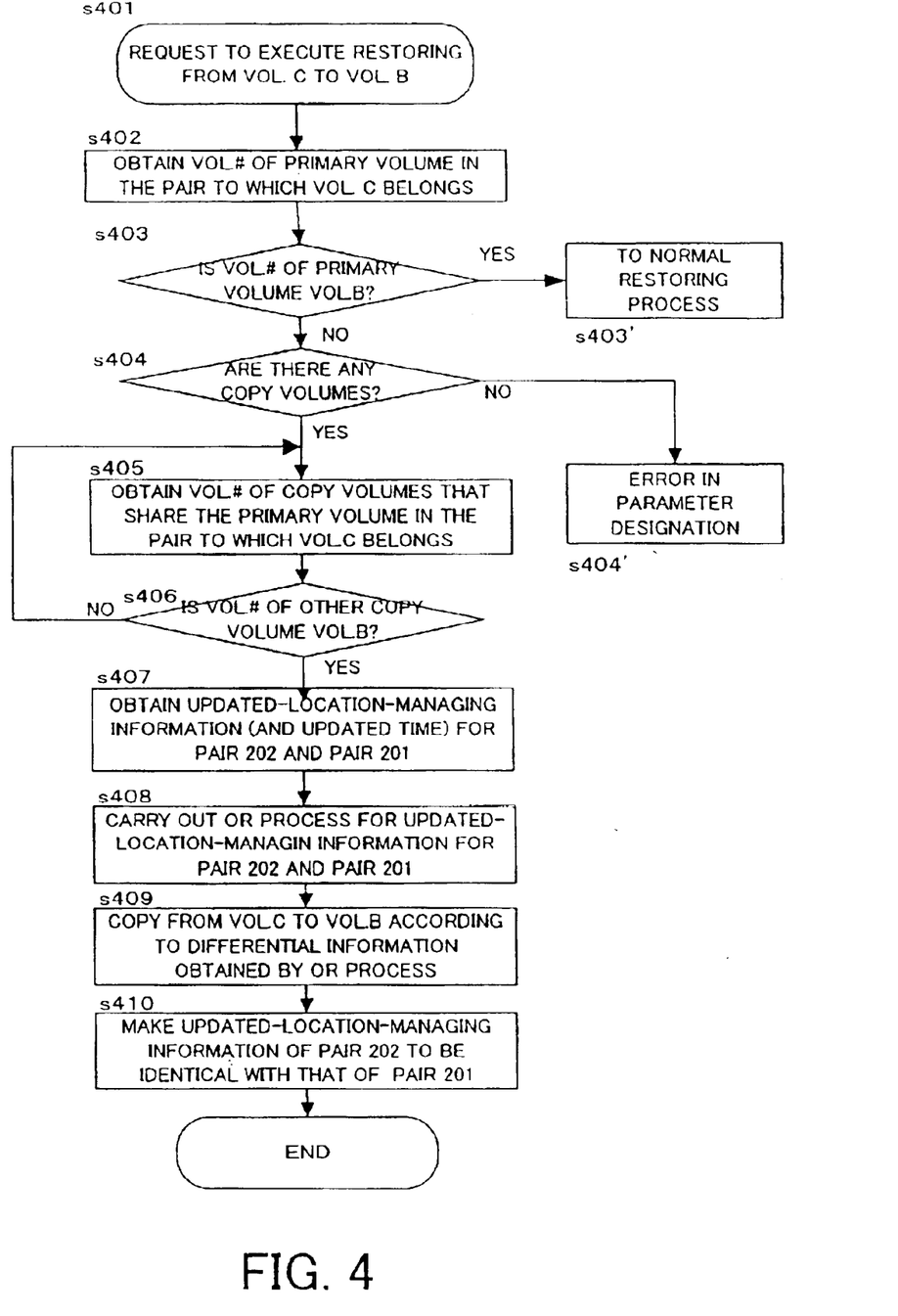
FIG. 4 shows a flowchart for explaining the method of managing backup and restoring according to the present embodiment.
Figure 5:
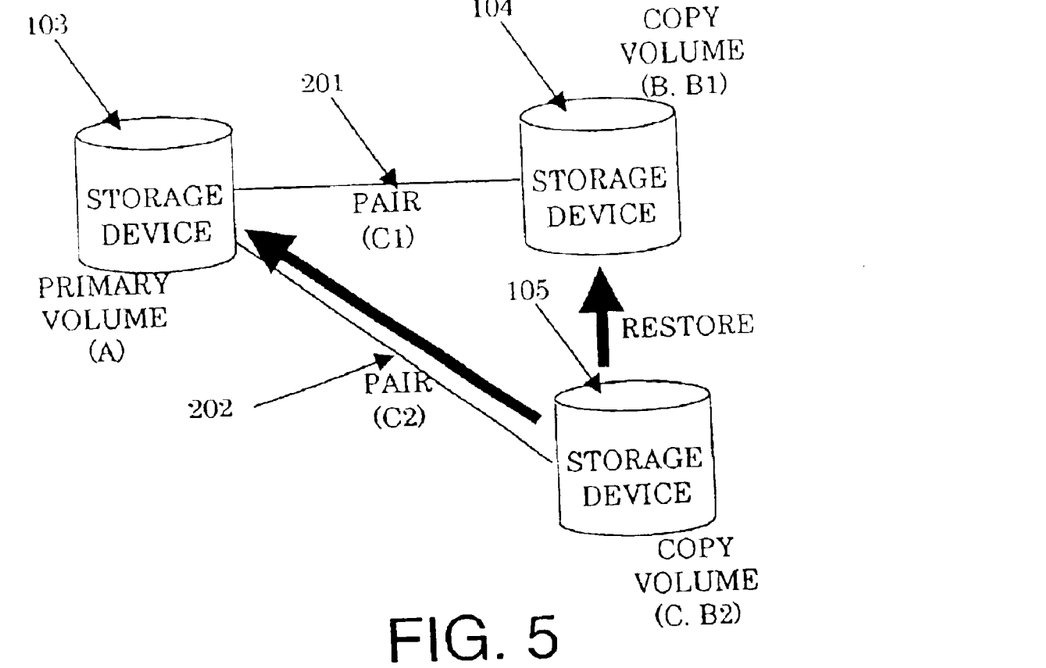
FIG. 5 shows a diagram for explaining the configuration comprising plural pairs according to the method of managing backup and restoring of the present embodiment.

FIG. 4 shows a flowchart for explaining a method of managing backup and restoring according to the present embodiment. FIG. 5 shows a diagram for explaining a configuration having a plurality of pairs according to the method of managing backup and restoring of the present embodiment. Next, explanation will be made of a method of managing backup and restoring being performed in a system constructed as above according to one aspect of the present invention.

As shown in FIG. 5, the storage device 103 is taken as a primary volume A. This storage device 103 and the storage device 104 are set as a pair 201, and a first copy volume B is created in this storage device 104. On the other hand, the storage device 103 and the storage device 105 are also set as a pair 202, and a second copy volume C is created in this storage device 105. Currently, each of the pairs 201, 202 is kept in a split state in which each of the primary and copy volumes can be used by different applications.

The addresses, at which updating of data has been carried out in each of the volumes during the split state, are stored in the common memory 110 as the updated-location-managing information 401 managed for each pair. The time at which updating was carried out (i.e., the updated time) may also be stored when storing the address in the common memory 110. Further, if, for example, the primary and copy volumes in the pair 202 are in a non-split state such as a state where the volumes are synchronized, the pair 202 is changed to the split state when the later-explained restoring request is received. By constructing the volumes of the storage devices as explained above, not only does it become possible to use the primary volume A and the copy volume B with different applications, but also, it becomes possible to easily restore the volumes to a state before the volumes were used by the respective applications.

Incidentally, there sometimes arise demands to return the volumes that have been used by respective applications, as explained above, back to a state before they were used by those applications. In this case, another copy volume C may be provided for storing a state in which both the primary volume A and the copy volume B are used by separate applications. However, in a case where an enormous amount of information is stored in such a volume, if it were to carry out a process of copying the whole copy volume C respectively to the primary volume A and the copy volume B, which is a copy of volume A, it will take much time for processing. Accordingly, it will result in a delay in starting processes that are to be carried out after completion of the above-mentioned copying process.

Therefore, in such a case, it is preferred to manage data that has been updated as a result of being used by an application, and to restore only the sections that have been updated back to their original states.

As a configuration for solving the above-mentioned problem, a copy volume D configuring a pair with the volume B, which is a copy volume of the primary volume A, may be provided in addition to the pair volume C provided for the primary volume A. According to this configuration, at any time, the primary volume A can be written back by the copy volume C forming a pair with the volume A, with only the differences in which change has occurred.

On the other hand, the copy volume B will configure a pair with another secondary volume D created at the time when the copy volume C is created. Then, if there is a request to restore the volume B back to a state before having been used by an application, the copy volume B will only need to be restored by the volume D with only the differences pertaining to updating at the time when such a request occurs, as with the volumes A and C. Accordingly, the primary volume A and its copy volume B will be able to be operated by separate applications. Also, since only the updated sections will need to be restored based on the information indicative of the differences with the copy volumes that form pairs with the respective volumes, it becomes possible to restore both the primary volume A and its copy volume B back to a state before being used by the applications in a short amount of time.

However, if this kind of procedure is used, as explained above, it becomes necessary to configure pair volumes that respectively form a pair with the two volumes, i.e., the primary volume A and the copy volume B at a certain time T. Here, the above-mentioned copy volume C for the primary volume A, and the above-mentioned copy volume D for the volume B, which is a copy volume of the primary volume A, correspond to the above-mentioned pair volumes.

However, since a pair volume is required for each of the volumes, this will result in that many volumes will be used and the costs for the volumes will increase.

In order to solve the above-mentioned problems, according to one aspect of the present invention, the copy volume C is configured as shown in FIG. 5 so that it is shared among the primary volume A and its copy volume B, which are independently usable. Accordingly, a method is provided in which the copy volume C is shared among the primary volume A and its copy volume B as a volume for writing the primary volume A and the copy volume B back to their previous states.

Below, explanation will be made in detail of the procedure.

When the storage control device 102 receives, at time t2, a request from the processing device 101 to restore the copy volume B, forming pair 201, with the contents of the copy volume C belonging to pair 202 (s401), the storage control device 102 will obtain, from the above-mentioned pair information 300 in the common memory 110, a volume number of the primary volume of the pair 202 to which the copy volume C belongs (s402). If the volume number of the primary volume indicates "copy volume B", this will signify that the volumes B and C are forming a one-to-one pair. Therefore, a restoring process between copy volumes according to the present invention will become unnecessary, and thus, a normal restoring procedure is carried out and the procedure is ended (s403').

On the other hand, if it is determined at step s403 that the primary volume is not the copy volume B, information regarding other copy volumes that share the primary volume will be obtained (s405). If no other copy volume that shares the same primary volume exists, it will not be possible to carry out the restoring between copy volumes; thus, it will be determined that there is an error in parameter designation, and the procedure is ended (s404'). On the other hand, if it is determined that other copy volumes exist, a routine process is conducted between steps s405 and s406 until the copy volume B is detected.

If the copy volume B is detected (s406), updated-location-managing information for each of the pairs 201, 202 taken at, for example, an updated time t1 when updating was carried out before and closest to time t2 is obtained from the common memory 110 (s407). The respective pieces of updated-location-managing information obtained for each of the pairs 201, 202 are merged according to, for example, the ON/OFF information on the respective bitmaps, and differential information indicative of a difference between the pieces of updated-location-managing information among the copy volume B and the copy volume C at updated time t1 is generated (s408). This differential information becomes a differential information pertaining to updating carried out within the pair 202, which includes the copy volume C taken as the source for restoring in this case, during a period from the time of re-sync (right before time t2), i.e. from the most recent resynchronization process for the pair 202 before time t2, until time t2.

Figure 6:
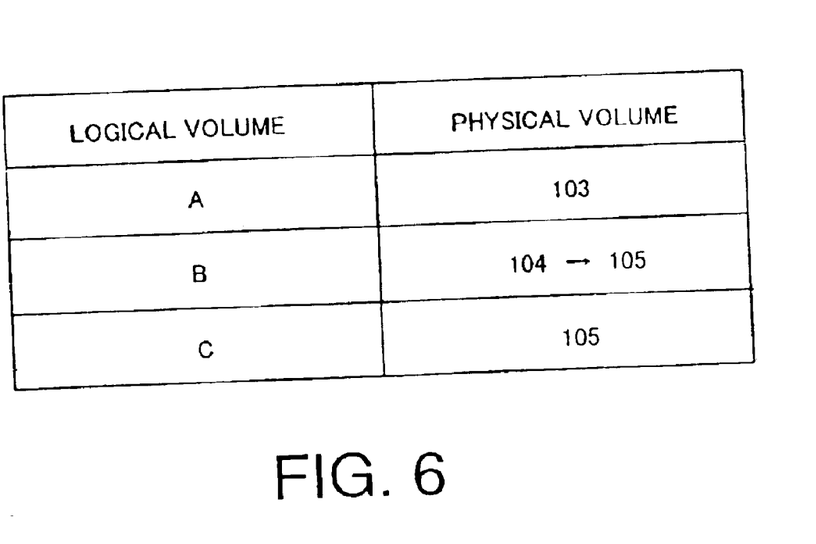
FIG. 6 shows a conceptual illustration of changing the relationship in a table that correlates the logical addresses and the physical addresses of data in each of the storage devices.

According to the block addresses in the LUNs designated by the above-mentioned differential information, the storage control device 102 copies the relevant data blocks from the copy volume C to the copy volume B. Accordingly, the copy volume B is reproduced (restored) to have the contents of the copy volume C taken at the time before the updated time t1 when a re-sync process for the pair 202 was carried out (s409). Here, a table may be provided for correlating the logical addresses and the physical addresses of data in each of the storage devices being managed by the storage control device 102, and this table may be changed in order to correlate the logical address for the copy volume B, which is to be subjected to restoring, and the physical address of the data in the copy volume C to be the source for restoring the copy volume B. (A conceptual example of this is shown in FIG. 6.) Accordingly, it becomes possible to carry out a restoring process from the copy volume C to the copy volume B, without actually transferring any data. When the data designated by the above-mentioned differential information is copied from the copy volume C to the copy volume B and the restoring process is finished, the updated-location-managing information for the pair 201 is changed so that it is identical with the updated-location-managing information for the pair 202 (s410), and the procedure is ended.

According to the present invention, in a configuration comprising one primary volume and a plurality of copy volumes created in relation to this primary volume, it becomes possible to use one of the copy volumes as a common backup volume for all of the primary and copy volumes. Accordingly, the number of backup volumes can be reduced, and system efficiency can be enhanced. Further, by appropriately using the differential information, which indicates the difference between the updated-location-managing information for the primary volume and the copy volumes, for carrying out restoring, it becomes possible to reduce the amount of data to be copied, and to enhance both data-processing efficiency and system operability.

Indicated below is an example in which the above-mentioned configuration can effectively be used.

For example, assume a case where the hourly wages and the hours worked (i.e., working hours) in a day regarding a plurality of employees are accumulated in the primary volume A of FIG. 5. That is, the working hours for each of the employees are accumulated based on the time he/she arrived in office and the time that he/she left. After the working hours are over for that day, the data in the primary volume A is used as data for calculating the payment for that day for each of the employees. In such a case, there is a need to prepare a paired volume for the primary volume A in order to calculate the daily wages. Such a paired volume is equivalent to the above-mentioned copy volume C. The primary volume A and the copy volume C will be brought into a split state after finishing accumulation of the working hours and before starting the application for calculating the daily wages. The data in the primary volume A will then be used and updated by that application. Then, after this process has finished, by restoring only the sections that have been updated by referring to the updated-location-managing information indicating a difference between the primary volume A and the copy volume C, the primary volume A will be reproduced back to a state before having been used by the application, that is, to the state of the copy volume C at the time when the pair was split. Then, the copy volume C and the primary volume A will again be brought into synchronism, and the primary volume A will be in a state capable of accumulating data for the next day.

Here, one volume (that is, the primary volume A) was used for calculating the daily wages. However, if another kind of computing is to be carried out by a different application, another copy volume will become necessary. Such an incident may occur, for example, in a case where calculation is made for the total overtime hours for the employees, other than the calculation for daily wages. In such a case, another copy volume B will be created, and this copy volume B will be used for calculating the amount of overtime work. The present invention attempts to maintain a plurality of volumes that are updated by different applications with a single copy volume for backup (i.e., the copy volume C in FIG. 5).

Others

In the above-mentioned examples, it is configured so that the host processing device 101 issues the backup request. However, it may be configured so that the storage control device 102 issues the backup request. Further, although the storage control device 102 and the storage devices 103–106 are configured as separate devices in the above-mentioned examples, the devices may be configured integrally. Further, the storage devices 103–106 do not have to be a disk-array apparatus, but other various kinds of devices, such as semiconductor disk devices and the like, may be adopted. Furthermore, although explanation was made where the storage control device 102 carries out backup-and-restoring on a logical unit basis, it is needless to say that the present invention can be applied to a case where backup-and-restoring is carried out on a physical unit basis.

The following procedure may be adopted as an embodiment according to the present invention. In a storage system where each of the copy volumes originates from a single volume and configures a pair with the single volume, and each of the copy volumes is capable of being independently used, a method of managing backup and restoring of data between a plurality of copy volumes in the storage system may comprise: when a primary volume and a copy volume that configure each of the pair are used by separate applications, storing, for each of the pair in a memory, an address at which updating of data has been made in the primary and copy volumes as updated-location-managing information; in case a copy volume B1 configuring a pair C1 is to be restored to have the contents of a copy volume B2 belonging to another pair C2 other than the pair C1, obtaining, from the memory, pieces of updated-location-managing information D1, D2 for each of the pairs C1, C2; generating differential information by merging the pieces of updated-location-managing information D1 and D2 obtained, the differential information indicative of a difference in the pieces of updated-location-managing information between the copy volume B1 and the copy volume B2; and reproducing the copy volume B1 to have the contents of the copy volume B2 by copying data designated by the differential information from the copy volume B2 to the copy volume B1.

Further, in a storage system where each of the copy volumes originates from a single volume and configures a pair with the single volume, and each of the copy volumes is capable of being independently used, a method of managing backup and restoring of data between a plurality of copy volumes in the storage system may comprise: when a primary volume and a copy volume that configure each of the pair are used by separate applications, storing, for each of the pair in a memory, an address at which updating of data has been made in the primary and copy volumes as updated-location-managing information, the address being stored along with an updated time T at which updating was carried out; in case a copy volume B1 configuring a pair C1 is to be restored to have the contents of a copy volume B2 belonging to another pair C2 other than the pair C10, obtaining, from the memory at a predetermined time T2, pieces of updated-location-managing information D1, D2 stored at a predetermined updated time T1 on or before the time T2 for each of the pairs C1, C2; generating differential information by merging the pieces of updated-location-managing information D1 and D2 obtained, the differential information indicative of a difference in the pieces of updated-location-managing information between the copy volume B1 and the copy volume B2 at the updated time T1; and reproducing the copy volume B1 to have the contents of the copy volume B2 on or before the updated time T1, by copying data designated by the differential information from the copy volume B2 to the copy volume B1.

Further, when the data designated by the differential information has been copied from the copy volume B2 to the copy volume B1, the updated-location-managing information for the pair C1 may be changed to be identical with the updated-location-managing information for the pair C2.

Further, the pair may be brought into a split state in which each of the primary and copy volumes configuring that pair can be used by separate applications, and an address at which updating of data has been made in each of the volumes in the split state may be stored, along with an updated time T at which updating was carried out, as the updated-location-managing information.

Further, a restoring process from the copy volume B2 to the copy volume B1 may be carried out by correlating a logical address of data to be restored in the copy volume B1, and a physical address of data to be the source of restoring in the copy volume B2.

Further, a storage control device capable of being used for a method of managing backup and restoring data may comprise: means for reading/writing data from/to the primary volume and the copy volumes according to a request from a host apparatus connected through communication means; and means for executing the above-mentioned steps.

Further, a storage control device capable of being used for a method of managing backup and restoring data may comprise: a processor reading/writing data from/to the primary volume and the copy volumes according to a request from a host apparatus connected through an interface; and a computer readable medium including codes for causing the storage control device perform the steps.

According to the present invention, it becomes possible to provide an efficient and highly operable method of managing backup and restoring among copy volumes.

Although the preferred embodiment of the present invention has been described in detail, it should be understood that various changes, substitutions and alterations can be made therein without departing from spirit and scope of the inventions as defined by the appended claims.

What is claimed is:

1. A method of managing backup and restoring of data between a plurality of copy volumes in a storage system, each of said copy volumes originating from a single volume and configuring a pair with said single volume, each of said copy volumes capable of being independently used, said managing method comprising:

when said volumes configuring each said pair are used by separate applications, storing, for each said pair in a memory, an address at which updating of data has been made in said volumes as updated-location-managing information;

in case a copy volume configuring a first pair is to be restored to have the contents of a copy volume belonging to a second pair, obtaining, from said memory, pieces of said updated-location-managing information for each of said first and second pairs;

generating differential information by merging said pieces of updated-location-managing information obtained, said differential information indicative of a difference in said pieces of updated-location-managing information between the copy volumes; and reproducing said copy volume which is to be restored to have the contents of said copy volume to be the source of restoring, by copying data designated by said differential information from said copy volume to be the source of restoring to said copy volume which is to be restored.

2. A method of managing backup and restoring of data between a plurality of copy volumes in a storage system, each of said copy volumes originating from a single volume and configuring a pair with said single volume, each of said copy volumes capable of being independently used, said managing method comprising:

when a primary volume and a copy volume that configure each said pair are used by separate applications, storing, for each said pair in a memory, an address at which updating of data has been made in said primary and copy volumes as updated-location-managing information;

in case a copy volume B1 configuring a pair C1 is to be restored to have the contents of a copy volume B2 belonging to another pair C2 other than said pair C1, obtaining, from said memory, pieces of updated-location-managing information D1, D2 for each of said pairs C1, C2;

generating differential information by merging said pieces of updated-location-managing information D1 and D2 obtained, said differential information indicative of a difference in said pieces of updated-location-managing information between said copy volume B1 and said copy volume B2; and reproducing said copy volume B1 to have the contents of said copy volume B2 by copying data designated by said differential information from said copy volume B2 to said copy volume B1.

3. A method of managing backup and restoring of data between a plurality of copy volumes in a storage system, each of said copy volumes originating from a single volume and configuring a pair with said single volume, each of said copy volumes capable of being independently used, said managing method comprising:

when a primary volume and a copy volume that configure each said pair are used by separate applications, storing, for each said pair in a memory, an address at which updating of data has been made in said primary and copy volumes as updated-location-managing information, said address being stored along with an updated time T at which updating was carried out;

in case a copy volume B1 configuring a pair C1 is to be restored to have the contents of a copy volume B2 belonging to another pair C2 other than said pair C1, obtaining, from said memory at a predetermined time T2, pieces of updated-location-managing information D1, D2 stored at a predetermined updated time T1 on or before said time T2 for each of said pairs C1, C2;

generating differential information by merging said pieces of updated-location-managing information D1 and D2 obtained, said differential information indicative of a difference in said pieces of updated-location-managing information between said copy volume B1 and said copy volume B2 at said updated time T1; and reproducing said copy volume B1 to have the contents of said copy volume B2 on or before said updated time T1, by copying data designated by said differential information from said copy volume B2 to said copy volume B1.

4. A managing method according to claim 1, wherein, when said data designated by said differential information has been copied from said copy volume to be the source of restoring to said copy volume which is to be restored, said updated-location-managing information for said first pair is changed to be identical with said updated-location-managing information for said second pair.

5. A managing method according to claim 2, wherein, when said data designated by said differential information has been copied from said copy volume B2 to said copy volume B1, said updated-location-managing information for said pair C1 is changed to be identical with said updated-location-managing information for said pair C2.

6. A managing method according to claim 1, wherein:
said pair is brought into a split state in which each of said volumes configuring that pair can be used by separate applications, and
an address at which updating of data has been made in each of said volumes in said split state is stored, along with an updated time T at which updating was carried out, as said updated-location-managing information.

7. A managing method according to claim 2, wherein:

said pair is brought into a split state in which each of said primary and copy volumes configuring that pair can be used by separate applications, and an address at which updating of data has been made in each of said volumes in said split state is stored, along with an updated time T at which updating was carried out, as said updated-location-managing information.

8. A managing method according to claim 1, wherein a restoring process from said copy volume, to be the source of restoring, to said copy volume, which is to be restored, is carried out by correlating a logical address of data to be restored in said copy volume which is to be restored, and a physical address of data to be the source of restoring in said copy volume to be the source of restoring.

9. A managing method according to claim 2, wherein a restoring process from said copy volume B2 to said copy volume B1 is carried out by correlating a logical address of data to be restored in said copy volume B1, and a physical address of data to be the source of restoring in said copy volume B2.

10. A storage control device capable of being used for a method of managing backup and restoring data between a plurality of copy volumes according to claim 1, said storage control device comprising:

means for reading/writing data from/to said volumes according to a request from a host apparatus connected through communication means; and means for executing said steps.

11. A storage control device capable of being used for a method of managing backup and restoring data between a plurality of copy volumes according to claim 2, said storage control device comprising:

means for reading/writing data from/to said primary volume and said copy volumes according to a request from a host apparatus connected through communication means; and means for executing said steps.

12. A storage control device capable of being used for a method of managing backup and restoring data between a plurality of copy volumes according to claim 1, said storage control device comprising:

a processor reading/writing data from/to said volumes according to a request from a host apparatus connected through an interface; and a computer readable medium including codes for causing said storage control device perform said steps.

13. A storage control device capable of being used for a method of managing backup and restoring data between a plurality of copy volumes according to claim 2, said storage control device comprising:

a processor reading/writing data from/to said primary volume and said copy volumes according to a request from a host apparatus connected through an interface; and a computer readable medium including codes for causing said storage control device perform said steps.

* * * * *